United States Patent
Ogura

(10) Patent No.: US 9,505,647 B2
(45) Date of Patent: Nov. 29, 2016

(54) METHOD OF MANUFACTURING BARREL-INTEGRATED LENS

(71) Applicant: KONICA MINOLTA, INC., Tokyo (JP)

(72) Inventor: Kazuyuki Ogura, Yao (JP)

(73) Assignee: KONICA MINOLTA, INC., Tokyo (JP)

( * ) Notice: Subject to any disclaimer, the term of this patent is extended or adjusted under 35 U.S.C. 154(b) by 140 days.

(21) Appl. No.: 14/379,008

(22) PCT Filed: Feb. 8, 2013

(86) PCT No.: PCT/JP2013/053005
§ 371 (c)(1),
(2) Date: Aug. 15, 2014

(87) PCT Pub. No.: WO2013/125367
PCT Pub. Date: Aug. 29, 2013

(65) Prior Publication Data
US 2016/0016837 A1    Jan. 21, 2016

(30) Foreign Application Priority Data
Feb. 22, 2012  (JP) .................................. 2012-036184

(51) Int. Cl.
*C03B 11/08* (2006.01)
*G02B 7/02* (2006.01)

(52) U.S. Cl.
CPC ................. *C03B 11/08* (2013.01); *G02B 7/02* (2013.01); *C03B 2215/49* (2013.01); *C03B 2215/50* (2013.01); *C03B 2215/79* (2013.01)

(58) Field of Classification Search
CPC ............... C03B 11/08; C03B 2215/03; C03B 2215/08; C03B 2215/49–2215/50; C03B 2215/79
See application file for complete search history.

(56) References Cited

U.S. PATENT DOCUMENTS

| | | | | | |
|---|---|---|---|---|---|
| 4,891,053 | A | * | 1/1990 | Bartman | C03B 11/08 264/1.21 |
| 5,274,502 | A | * | 12/1993 | Demerritt | C03B 11/08 359/642 |
| 5,378,255 | A | * | 1/1995 | Ito | C03B 11/08 65/226 |
| 2003/0056544 | A1 | * | 3/2003 | Yamanaka | C03B 11/08 65/305 |

(Continued)

FOREIGN PATENT DOCUMENTS

| | | |
|---|---|---|
| JP | 03265529 A | 11/1991 |
| JP | 08075973 A | 3/1996 |

(Continued)

OTHER PUBLICATIONS

International Search Report for International Application No. PCT/JP2013/053005; date of mailing, May 14, 2013, with English Translation.

(Continued)

*Primary Examiner* — Jason L Lazorcik
(74) *Attorney, Agent, or Firm* — Cantor Colburn LLP

(57) ABSTRACT

A method of manufacturing a barrel-integrated lens, in which a molded glass product is molded integrally with a barrel made of metal by means of a molten glass drop molding method, includes inserting an upper cylindrical die into a through opening from a side of a second cylindrical opening, and press molding the molten glass drop by a lower cylindrical die and the upper cylindrical die such that the molten glass drop is pressure welded to a connection opening.

12 Claims, 12 Drawing Sheets

(56) References Cited

U.S. PATENT DOCUMENTS

| | | | | |
|---|---|---|---|---|
| 2004/0174618 A1* | 9/2004 | Kikuchi | ................ | C03B 11/08 359/811 |
| 2004/0187522 A1* | 9/2004 | Kikuchi | ................ | C03B 11/08 65/39 |
| 2004/0196521 A1* | 10/2004 | Kikuchi | ................ | C03B 11/08 65/39 |
| 2005/0162758 A1* | 7/2005 | Tanaka | ................ | C03B 11/08 359/811 |
| 2006/0006557 A1* | 1/2006 | Hiranuma | ................ | B29D 11/00 264/1.7 |
| 2006/0198034 A1* | 9/2006 | Shikano | ................ | C03B 11/08 359/811 |
| 2007/0113588 A1* | 5/2007 | Huang | ................ | C03B 11/08 65/66 |
| 2008/0165438 A1* | 7/2008 | Nakamura | ................ | C03B 11/08 359/819 |
| 2010/0162762 A1* | 7/2010 | Ogura | ................ | C03B 11/08 65/66 |
| 2010/0177409 A1* | 7/2010 | Liu | ................ | C03B 11/08 359/819 |
| 2014/0347752 A1* | 11/2014 | Koike | ................ | C03B 11/08 359/819 |

FOREIGN PATENT DOCUMENTS

| | | |
|---|---|---|
| JP | 2003-292327 A | 10/2003 |
| JP | 2004-323289 A | 11/2004 |

OTHER PUBLICATIONS

Written Opinion of the International Searching Authority for International Applicaiton No. PCT/JP2013/053005; date of mailing, May 14, 2013, with English Translation.

* cited by examiner

METHOD OF MANUFACTURING BARREL-INTEGRATED LENS

The present U.S. patent application is a U.S. National Phase Application under 35 U.S.C. §371 of International Application PCT/JP2013/053005 filed on Feb. 8, 2013. This application claims a priority under the Paris Convention of Japanese patent application No. 2012-036184 filed on Feb. 22, 2012, the entirety of which is incorporated herein by reference.

TECHNICAL FIELD

The present invention relates to a method of manufacturing a barrel-integrated lens.

BACKGROUND ART

An optical component having a molded glass product formed integrally within a barrel is disclosed in Japanese Laid-Open Patent Publication No. 03-265529 (PTD 1) and Japanese Laid-Open Patent Publication No. 08-75973 (PTD 2).

Both of these documents disclose a manufacturing method of preparing a lens material in a spherical shape, heating the lens material within the barrel to a temperature equal to or higher than the softening point, and applying pressure to the lens material for formation of the molded glass product.

CITATION LIST

Patent Documents

PTD 1: Japanese Laid-Open Patent Publication No. 03-265529
PTD 2: Japanese Laid-Open Patent Publication No. 08-75973

SUMMARY OF INVENTION

Technical Problem

In the above-described methods of manufacturing an optical component, the lens material in a spherical shape needs to be prepared in advance. A step of preparing this lens material is a step of preparing a lens as an optical component, thus requiring advanced manufacturing techniques and manufacturing costs.

In addition, the spherical lens material obtained by the above-described manufacturing step further needs to be subjected to a step of arranging the lens material in a prescribed position within the barrel, as well as a heating and forming step. As a result, numerous steps are required for a manufacturing process.

The present invention was made to solve the above-described problems, and an object of the present invention is to provide a method of manufacturing a barrel-integrated lens that can require fewer manufacturing steps.

Solution to Problem

A method of manufacturing a barrel-integrated lens based on the present invention is a method of manufacturing a barrel-integrated lens, in which a molded glass product is molded integrally with a barrel made of metal by means of a molten glass drop molding method, and the molten glass drop molding method is a method of, using a lower die and an upper die, dropping a molten glass drop on the lower die, and then press molding the molten glass drop by the lower die and the upper die.

The lower die includes a lower cylindrical die, the lower cylindrical die having an optical surface for applying pressure to the molten glass drop on its upper end face and extending toward the upper die, and the upper die includes an upper cylindrical die, the upper cylindrical die being opposed to the lower cylindrical die, having an optical surface for applying pressure to the molten glass drop on its lower end face, and extending toward the lower die.

The barrel includes a through opening extending in an axial direction, and the through opening includes a first cylindrical opening positioned close to the lower die, and receiving the lower cylindrical die inserted therein during molding of the molten glass drop, a second cylindrical opening positioned close to the upper die, receiving the upper cylindrical die inserted therein such that a gap is produced in relation to the circumference of the upper cylindrical die during the molding of the molten glass drop, and having a diameter larger than a diameter of the first cylindrical opening, and a connection opening coupling the first cylindrical opening and the second cylindrical opening together.

The method of manufacturing a barrel-integrated lens includes the steps of inserting the lower cylindrical die into the through opening from a side of the first cylindrical opening of the through opening such that an upper end portion of the lower cylindrical die is positioned part way in the axial direction of the first cylindrical opening to expose a portion of an inner circumferential surface of the first cylindrical opening close to the connection opening, dropping a prescribed amount of the molten glass drop from a side of the second cylindrical opening such that the molten glass drop forms a substantially spherical shape by surface tension, starting from an upper end of the first cylindrical opening of the barrel, while not contacting an exposed opening surface of the connection opening, in a region surrounded by the upper end face of the lower cylindrical die and the exposed opening surface of the first cylindrical opening, and inserting the upper cylindrical die into the through opening from the side of the second cylindrical opening, and press molding the molten glass drop by the lower cylindrical die and the upper cylindrical die such that the molten glass drop is pressure welded to the connection opening.

Advantageous Effects of Invention

According to the method of manufacturing a barrel-integrated lens based on the present invention, a method of manufacturing a barrel-integrated lens that can require fewer manufacturing steps can be provided.

DESCRIPTION OF EMBODIMENTS

Embodiments based on the present invention will be described hereinafter with reference to the drawings. When a reference is made to a number, an amount and the like in the description of the embodiments, the scope of the present invention is not necessarily limited to that number, amount and the like unless otherwise specified.
In the description of the embodiments, the same or corresponding components are designated by the same reference numbers and redundant descriptions thereof may not be repeated.

First Embodiment

Figure 1:
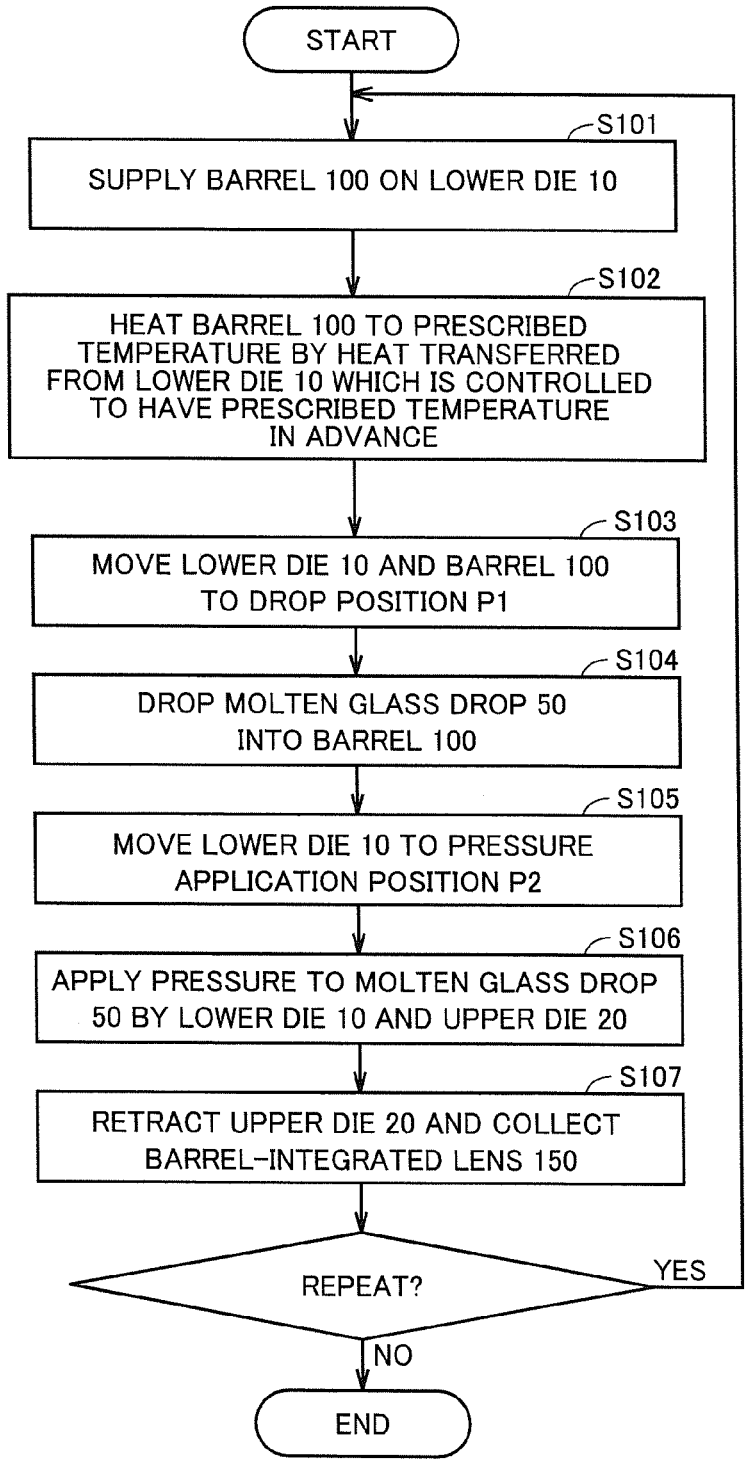
FIG. 1 is a flowchart of a method of manufacturing a barrel-integrated lens of a first embodiment.
Figure 2:
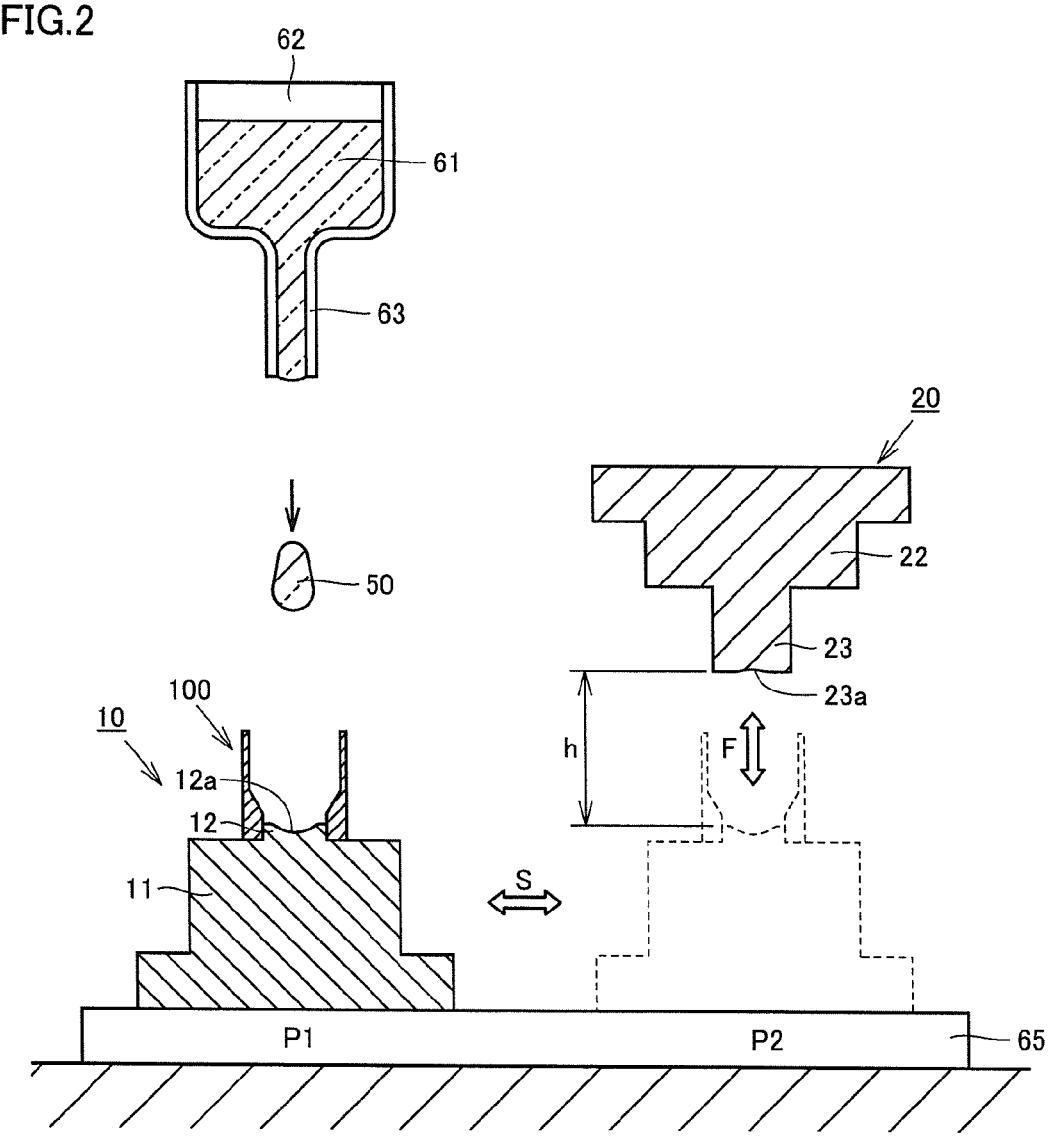
FIG. 2 is a first a schematic diagram of a manufacturing flow using an apparatus of manufacturing the barrel-integrated lens of the first embodiment.
Figure 3:
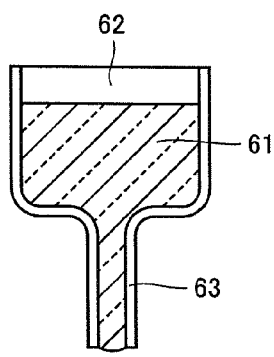
FIG. 3 is a second a schematic diagram of the manufacturing flow using the apparatus of manufacturing the barrel-integrated lens of the first embodiment.
Figure 3:
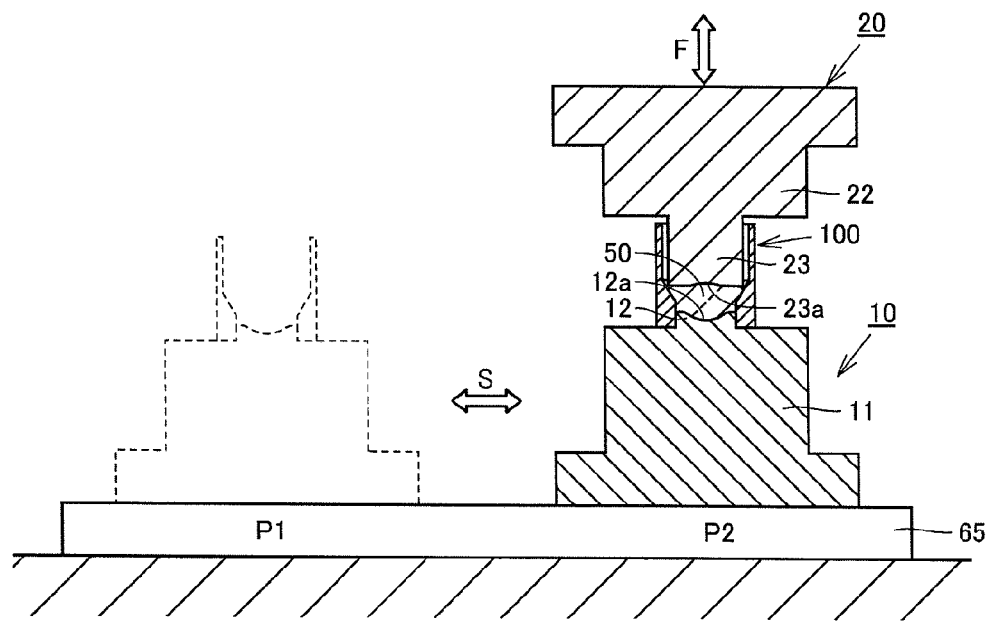

Referring to FIGS. 1 to 3, a method of manufacturing a barrel-integrated lens in this embodiment will be described below. FIG. 1 is a flowchart of the method of manufacturing a barrel-integrated lens in this embodiment, and FIGS. 2 and 3 are schematic diagrams of a manufacturing flow using an apparatus of manufacturing the barrel-integrated lens. FIG. 2 shows a state in a step (S104) of dropping a molten glass drop on a lower die, and FIG. 3 shows a state in a step (S106) of pressing the dropped molten glass drop by the lower die and an upper die.

(Apparatus of Manufacturing Barrel-Integrated Lens)

The apparatus of manufacturing a molded glass product shown in FIGS. 2 and 3 includes a lower die 10 and an upper die 20 as a molding die for pressing a molten glass drop 50.

Upper die 20 includes a base material 22, which has an upper cylindrical die 23 being opposed to a lower cylindrical die 12 provided on lower die 10 which will be described later and extending toward lower die 10. An optical surface (concave surface) 23a for pressing molten glass drop 50 is formed on a lower end face of this upper cylindrical die 23. Upper cylindrical die 23 has a diameter of from about 1.5 mm to about 4 mm.

A material for base material 22 can be appropriately selected and used depending on the conditions from among known materials for a molding die for press molding molten glass drop 50. Examples of preferred usable materials include various types of heat-resistant alloys (such as stainless steel), superhard materials mainly composed of tungsten carbide, various types of ceramics (such as silicon carbide and silicon nitride), and composite materials containing carbon.

Lower die 10 includes a base material 11, which has lower cylindrical die 12 being opposed to upper cylindrical die 23 and extending toward upper die 20. An optical surface (concave surface) 12a for pressing molten glass drop 50 is formed on an upper end face of this lower cylindrical die 12. Lower cylindrical die 12 has a diameter of from about 1 mm to about 3 mm.

A material for base material 11 of lower die 10 may be appropriately selected and used from among materials similar to those for base material 22 of upper die 20. The material for base material 11 of lower die 10 and the material for base material 22 of upper die 20 may be the same as or different from each other.

Lower die 10 and upper die 20 are constructed such that they can be heated to prescribed temperatures by not-shown heating means, respectively. Known heating means can be appropriately selected and used as the heating means. Examples of the heating means include a cartridge heater which is embedded in lower die 10 and upper die 20 for use, a sheet-like heater which is contacted with the outer side for use, an infrared heating device, and a high-frequency induction heating device. It is more preferable that lower die 10 and upper die 20 be constructed such that their temperatures can be controlled independently of each other.

Lower die 10 is constructed to be able to move along a guide 65 (direction of an arrow S in FIGS. 2 and 3) by not-shown driving means, between a position for receiving molten glass drop 50 (drop position P1) and a position for press molding molten glass drop 50 opposite to upper die 20 (pressure application position P2).

Upper die 20 is constructed to be able to move in a direction to press molten glass drop 50 (vertical direction (direction of an arrow F) in FIGS. 2 and 3) by not-shown driving means. While only upper die 20 is described as moving in the pressing direction in this example, this is not restrictive. Lower die 10 may be constructed to move in the pressing direction, or lower die 10 and upper die 20 may both be constructed to move in the pressing direction.

Arranged above drop position P1 is a drop nozzle 63 for dropping molten glass drop 50. Drop nozzle 63 is connected to the bottom of a melting tank 62 storing a molten glass 61, and constructed to drop molten glass drop 50 from its tip portion when heated by not-shown heating means.

(Barrel 100)

Figure 4:
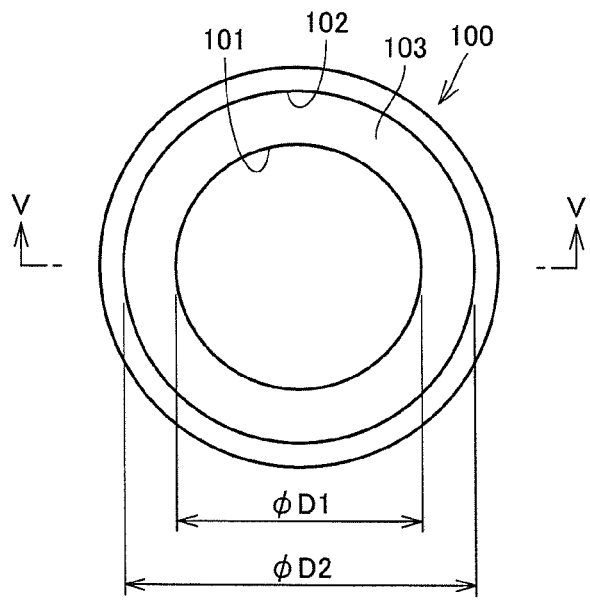
FIG. 4 is a plan view of the barrel used in the first embodiment.
Figure 5:
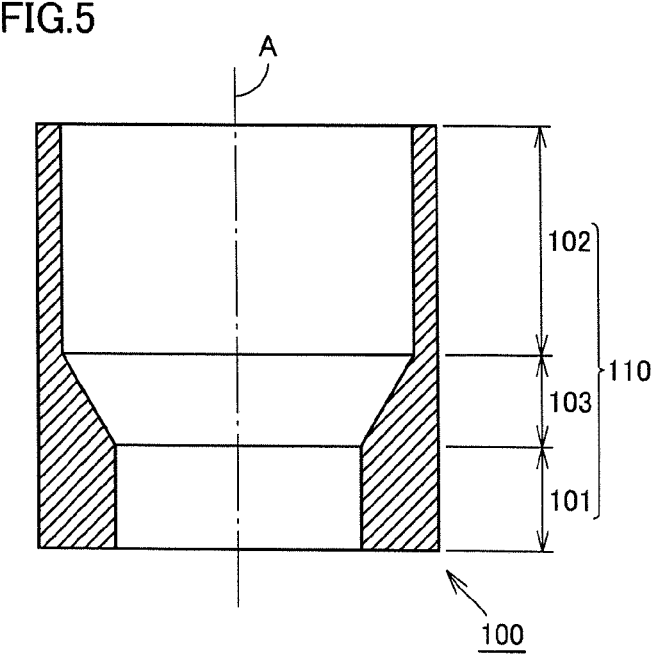
FIG. 5 is a cross-sectional view of the barrel used in the first embodiment, taken along line V-V in a direction of arrows in FIG. 4.

Referring now to FIGS. 4 and 5, the structure of a barrel 100 used in this embodiment will be described. FIG. 4 is a plan view of barrel 100 used in this embodiment, and FIG. 5 is a cross-sectional view of barrel 100 used in this embodiment, taken along line V-V in a direction of arrows in FIG. 4.

This barrel 100 has a cylindrical shape, and includes a through opening 110 extending in the direction of an axis A. Barrel 100 has a height of from about 3 mm to about 5 mm, and an outside diameter of from about 3 mm to about 6 mm.

Through opening 110 includes a first cylindrical opening 101, a second cylindrical opening 102, and a connection opening 103. First cylindrical opening 101 is positioned close to lower die 10, and receives lower cylindrical die 12 inserted therein during the molding of molten glass drop 50. Second cylindrical opening 102 is positioned close to upper die 20, receives upper cylindrical die 23 inserted therein such that a gap is produced in relation to the circumference of upper cylindrical die 23 during the molding of molten glass drop 50, and has a diameter (inside diameter; $\phi D2$ in FIG. 4) larger than a diameter (inside diameter; $\phi D1$ in FIG. 4) of first cylindrical opening 101. Connection opening 103 couples first cylindrical opening 101 and second cylindrical opening 102 together.

In this embodiment, as connection opening 103, a tapered surface having a diameter (inside diameter) that increases from first cylindrical opening 101 toward second cylindrical opening 102 is formed.

In this embodiment, first cylindrical opening 101 has a length of about 1.0 mm, second cylindrical opening 102 has a length of about 2.5 mm, and connection opening 103 has a length of about 0.5 mm, in the axial direction.

The same material as that for base material 11 and base material 22 can be used as a material for barrel 100. Examples of preferred materials include a material having a thermal expansion coefficient close to a thermal expansion coefficient (about $11.3 \times 10^{-6}$) of molten glass drop 50. For example, austenitic stainless steel (e.g., SUS430 (thermal expansion coefficient: $10.4 \times 10^{-6}$)), or ferritic stainless steel (e.g., Shimomura Tokushu Seiko Co., Ltd., product name: SF20T (thermal expansion coefficient: $11.0 \times 10^{-6}$)) may be used.

(Method of Manufacturing Barrel-Integrated Lens)

Figure 6:
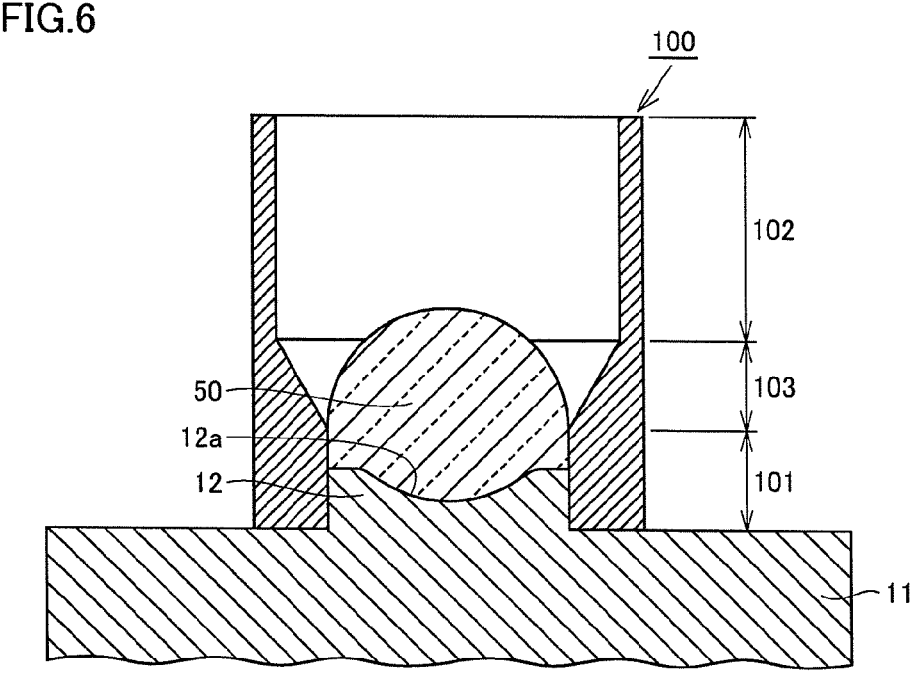
FIG. 6 is a cross-sectional view showing a state where a molten glass drop has been dropped, in the method of manufacturing a barrel-integrated lens of the first embodiment.
Figure 7:
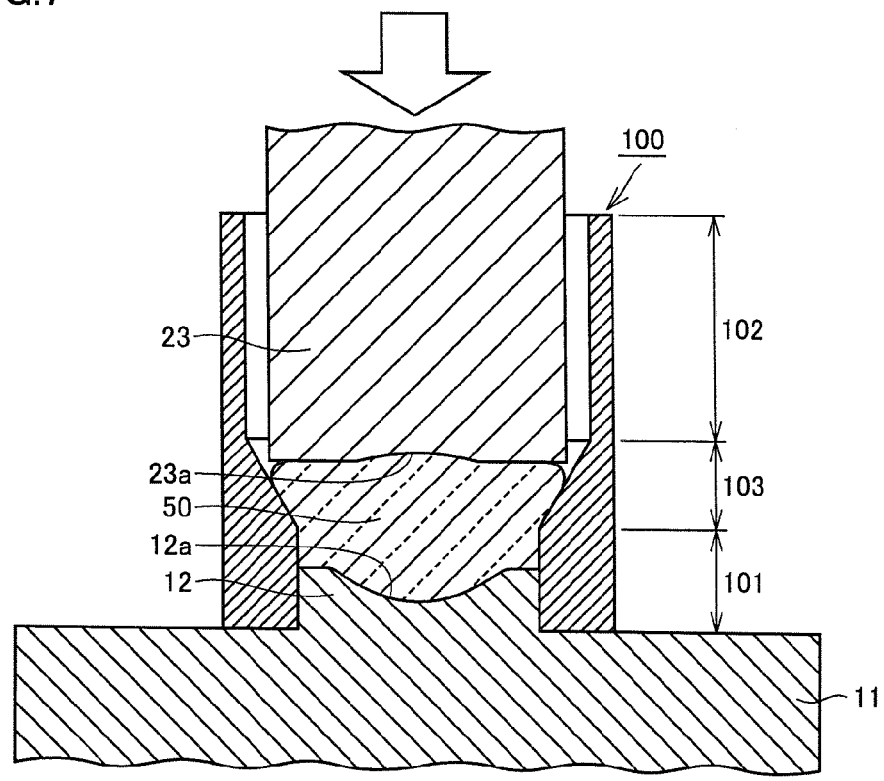
FIG. 7 is a cross-sectional view showing a state where pressure is being applied to the molten glass drop, in the method of manufacturing a barrel-integrated lens of the first embodiment.
Figure 8:
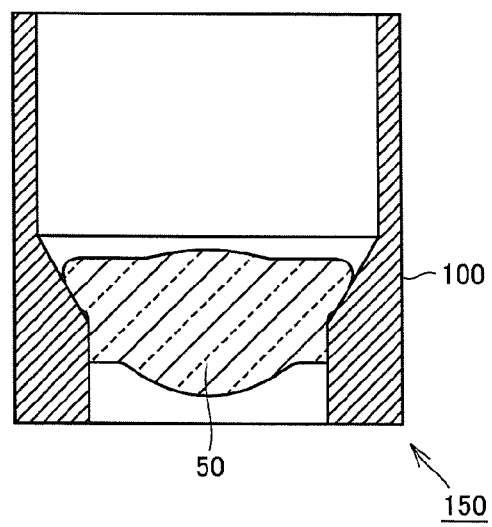
FIG. 8 is a cross-sectional view of the barrel-integrated lens manufactured by the method of manufacturing a barrel-integrated lens of the first embodiment.
Figure 9:
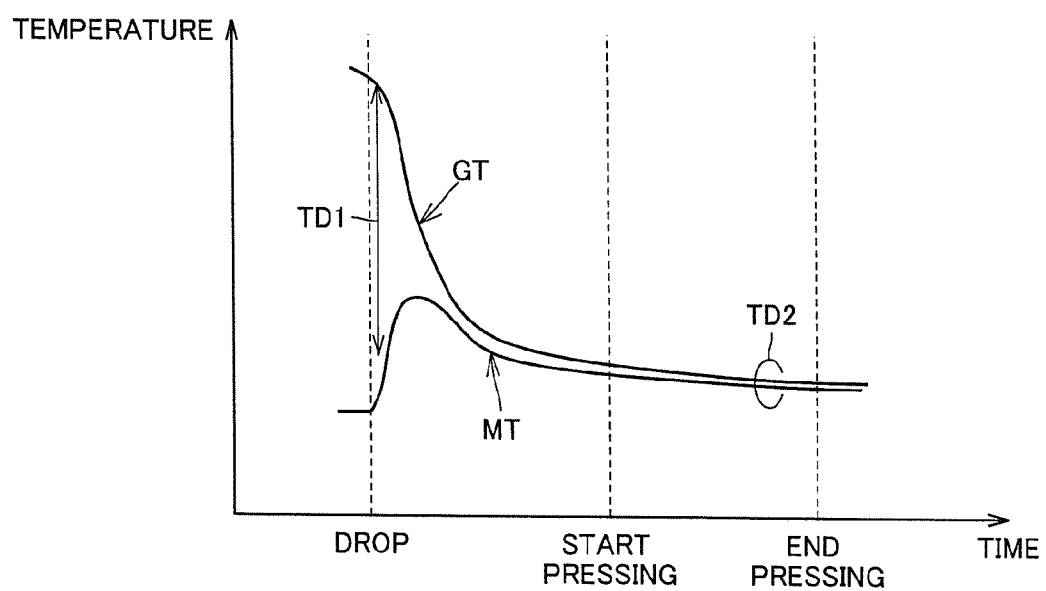
FIG. 9 shows relation between a time elapsed since the dropping of the molten glass drop and temperature variations of the molten glass drop and the barrel.

A method of manufacturing the barrel-integrated lens will be described below according to the flowchart shown in FIG. 1 and with reference to FIGS. 6 to 9 as appropriate. FIG. 6 is a cross-sectional view showing a state where a molten glass drop has been dropped, in the method of manufacturing a barrel-integrated lens of this embodiment, FIG. 7 is a cross-sectional view showing a state where pressure is being applied to the molten glass drop, in the method of manufacturing a barrel-integrated lens of this embodiment, FIG. 8 is a cross-sectional view of the barrel-integrated lens manufactured by the method of manufacturing a barrel-integrated lens of this first embodiment, and FIG. 9 shows relation between a time elapsed since the dropping of the molten glass drop and temperature variations of the molten glass drop and the barrel.

First, as shown in FIG. 6, barrel 100 is supplied on lower die 10 (step S101). With barrel 100 being placed on lower die 10, lower cylindrical die 12 is inserted into through opening 110. With lower cylindrical die 12 being inserted into through opening 110, an upper end portion of lower cylindrical die 12 is positioned in a substantially middle portion in the axial direction of first cylindrical opening 101 of barrel 100, to expose a portion of an inner circumferential surface of first cylindrical opening 101 close to connection opening 103. Next, barrel 100 is heated to a prescribed temperature by heat transferred from lower die 10 which is controlled to have the prescribed temperature in advance (step S102). In order to prevent the occurrence of axial deviation due to the gap produced between lower cylindrical die 12 and first cylindrical opening 101, a guide member may be provided for positioning barrel 100 in relation to lower cylindrical die 12.

The prescribed temperature may be selected appropriately to ensure that a satisfactory transfer surface (optical surface) can be formed on the molded glass product by press molding. If the temperature of lower die 10, upper die 20 and barrel 100 is too low, the molded glass product tends to have large wrinkles, and the shape accuracy of the transfer surface may be lowered. Conversely, if the temperature is higher than necessary, lower die 10, upper die 20 and barrel 100 bend to be fused with the molded glass product, thus shortening the lives of lower die 10, upper die 20 and barrel 100.

Since the appropriate temperature actually varies depending on various conditions such as the type, shape and size of the glass, as well as the materials and sizes of lower die 10, upper die 20 and barrel 100, it is preferable to experimentally obtain the appropriate temperature. Usually, if glass to be used has a glass transition temperature Tg, the temperature is preferably set in a range from about Tg−100° C. to about Tg+100° C. The heating temperatures of lower die 10, upper die 20 and barrel 100 may be the same as or different from one another.

Next, lower die 10 and barrel 100 are moved to drop position P1 (step S103), and molten glass drop 50 is dropped from drop nozzle 63 (step S104) (see FIG. 2). The dropping of molten glass drop 50 is carried out by heating drop nozzle 63 connected to melting tank 62 storing molten glass 61 to a prescribed temperature. When drop nozzle 63 is heated to the prescribed temperature, molten glass 61 stored in melting tank 62 is supplied to the tip portion of drop nozzle 63 under its own weight, and retained as a droplet by surface tension. When the molten glass retained at the tip portion of drop nozzle 63 has a certain mass, the glass is naturally separated from drop nozzle 63 by gravity and falls down as molten glass drop 50.

The mass of molten glass drop 50 dropped from drop nozzle 63 can be adjusted by an outside diameter of the tip portion of drop nozzle 63 and the like. Depending on the type of glass and the like, the molten glass drop of from about 0.1 g to about 2 g can be dropped. Alternatively, the molten glass drop of from 1 mg to 200 mg can be dropped by providing a member, which has a narrow hole of from about 1 mm to about 4 mm in diameter for reducing the size of the molten glass drop, between drop nozzle 63 and lower die 10.

As shown in FIG. 6, in this embodiment, a prescribed amount of molten glass drop 50 is dropped from the side of second cylindrical opening 102. Dropped molten glass drop 50 forms a substantially spherical shape by surface tension, starting from an upper end of first cylindrical opening 101 of barrel 100 (inner circumferential circle which is a border between first cylindrical opening 101 and connection opening 103), while not contacting an inner circumferential surface of connection opening 103, in a region surrounded by an upper end face of lower cylindrical die 12 and the exposed inner circumferential surface of first cylindrical opening 101.

Dropped molten glass drop 50 forms a substantially spherical shape by surface tension starting from the upper end of first cylindrical opening 101 in this manner because the tapered surface having a diameter (inside diameter) that increases from first cylindrical opening 101 toward second cylindrical opening 102 is formed as connection opening 103. The presence of connection opening 103 also makes it easy to obtain a spherical shape coaxial with barrel 100 starting from the upper end of first cylindrical opening 101.

Since dropped molten glass drop 50 forms a substantially spherical shape by surface tension starting from the upper end of first cylindrical opening 101 of barrel 100 as described above, when molten glass drop 50 is press molded by lower die 10 and upper die 20, molten glass drop 50 in a spherical shape is pressed, and spread and pressure welded to the portion of connection opening 103 as shown in FIG. 7. As a result, pressure can be applied readily as compared to an example where the connection opening is not provided, and the molten glass drop is compression bonded to the connection opening, thus increasing bonding strength.

Furthermore, since dropped molten glass drop 50 forms a substantially spherical shape by surface tension starting from the upper end of first cylindrical opening 101, a surface area of dropped molten glass drop 50 which does not contact the barrel is increased, thus preventing temperature reduction of molten glass drop 50 caused by the contact with the barrel, as well as the resulting hardening of molten glass drop 50. As a result, molten glass drop 50 is pressurized and spread to connection opening 103 while maintaining a high temperature and fluidity, thereby obtaining high bonding strength.

The angle of the tapered surface is not particularly limited. In addition, connection opening 103 does not necessarily need to be the tapered surface having a diameter (inside diameter) that increases from first cylindrical opening 101 toward second cylindrical opening 102 as in this embodiment, but may be a radially extending flat surface connecting first cylindrical opening 101 and second cylindrical opening 102 together.

The types of usable glass are not particularly limited, and known glass can be selected and used depending on the application. Examples of the usable glass include optical glass such as borosilicate glass, silicate glass, phosphate glass, and lanthanum-based glass. While the glass has a thermal expansion coefficient of about $11.3 \times 10^{-6}$ as described above, this is not restrictive, and the coefficient may be from about 9 to about $13 \times 10^{-6}$.

Next, lower die 10 is moved to pressure application position P2 (step S105), and as shown in FIG. 7, upper die 20 is moved down to insert upper cylindrical die 23 into through opening 110 from the side of second cylindrical opening 102 of barrel 100, and molten glass drop 50 is press molded by lower cylindrical die 12 of lower die 10 and upper cylindrical die 23 of upper die 20 such that molten glass drop 50 is pressure welded to connection opening 103 (step S106).

Here, in this embodiment, the thermal expansion coefficient of molten glass drop 50 and the thermal expansion coefficient of barrel 100 are substantially the same as described above. That the thermal expansion coefficients are substantially the same means that the difference between the thermal expansion coefficients is within $2 \times 10^{-6}$.

Accordingly, the step of press molding molten glass drop 50 by lower cylindrical die 12 and upper cylindrical die 23 is performed after a lapse of time during which the temperature of molten glass drop 50 and the temperature of barrel 100 reach substantially the same temperature, since the step of dropping molten glass drop 50.

As shown in FIG. 9, a difference (TD1) between a glass temperature GT of molten glass drop 50 and a barrel temperature MT of barrel 100 immediately after the dropping of molten glass drop 50 is great. The difference between glass temperature GT and barrel temperature MT of barrel 100 is a few hundred degrees Celsius. If molten glass drop 50 is press molded by lower cylindrical die 12 and upper cylindrical die 23 while this temperature difference is maintained, a gap tends to be produced between molten glass drop 50 and barrel 100 in a process of cooling the dropped molten glass drop, which may result in failure to obtain high joint strength between molten glass drop 50 and barrel 100.

As shown in FIG. 9, as time passes since the dropping of molten glass drop 50, glass temperature GT of molten glass drop 50 decreases sharply soon after the dropping on lower cylindrical die 12 (heat transfer to lower cylindrical die 12 and barrel 100). On the other hand, the temperature of barrel 100 increases (heat transfer from molten glass drop 50).

When this glass temperature GT and the temperature of barrel 100 reach appropriate temperatures (substantially the same temperature: approximately the temperature difference indicated by TD2 in FIG. 9), molten glass drop 50 is press molded by lower cylindrical die 12 and upper cylindrical die 23. Accordingly, since molten glass drop 50 and barrel 100 have substantially the same thermal expansion coefficient, they shrink at the same ratio in the process of cooling molten glass drop 50 by press molding.

As a result, between a joint surface of molten glass drop 50 and a joint surface of barrel 100, the joint surfaces are not separated from each other, thereby obtaining high joint strength between molten glass drop 50 and barrel 100.

In this embodiment, the time between the dropping and the start of pressing as shown in FIG. 9 is between about three seconds and about four seconds, and the time between the start of pressing (press molding) and the end of pressing is between about two seconds and about three seconds.

When molten glass drop 50 (molded glass product 50 after the press molding) is cooled to a prescribed temperature, upper die 20 is moved up to release the pressure. Depending on the type of the glass, the size and shape of molded glass product 50, the required accuracy and the like, it is usually preferable to release the pressure after molten glass drop 50 has been cooled to a temperature close to Tg of the glass.

A load applied in order to apply pressure to molten glass drop 50 may be constant at all times, or may be varied with time. The magnitude of the applied load may be set appropriately depending on the size and the like of a molded glass product to be manufactured. Driving means for moving upper die 20 up and down is not particularly limited, and known driving means such as an air cylinder, a hydraulic cylinder, and an electric cylinder including a servo motor can be selected and used appropriately.

Thereafter, upper die 20 is moved up and retracted, and a barrel-integrated lens 150 shown in FIG. 8 is collected (step S107), to complete the manufacture of barrel-integrated lens 150. If a barrel-integrated lens 150 is subsequently manufactured, barrel 100 may be supplied on lower die 10 again (step S101), followed by the repetition of the subsequent steps.

According to the method of manufacturing a barrel-integrated lens in this embodiment described above, a step of molding a lens optical surface on the molten glass drop and a step of integrating the lens with the barrel can be simultaneously performed. Thus, a method of manufacturing a barrel-integrated lens that can require fewer manufacturing steps can be provided.

Moreover, since molten glass drop 50 is dropped such that it forms a substantially spherical shape by surface tension, starting from the upper end of first cylindrical opening 101 of barrel 100 (inner circumferential circle which is the border between first cylindrical opening 101 and connection opening 103), while not contacting the opening surface of connection opening 103, pressure can be applied readily to dropped molten glass drop 50, thereby obtaining high joint strength between the pressurized molten glass drop and connection opening 103.

Furthermore, since the materials for the molten glass drop and barrel are selected from the viewpoint of thermal expansion coefficient, and the time between the dropping and the start of pressing and the time between the start of pressing and the end of pressing in the pressing step are adjusted, high joint strength can be obtained between the molten glass drop and the barrel.

Second Embodiment

Referring to FIGS. 10 to 14, a method of manufacturing a barrel-integrated lens in this embodiment will be described below. The method of manufacturing a barrel-integrated lens in this embodiment is characterized by a shape of the barrel, and the apparatus and method for manufacturing the barrel-integrated lens are the same as those in the above first embodiment. Accordingly, the structure of a barrel 200 in this embodiment will be described here in detail.

Figure 10:
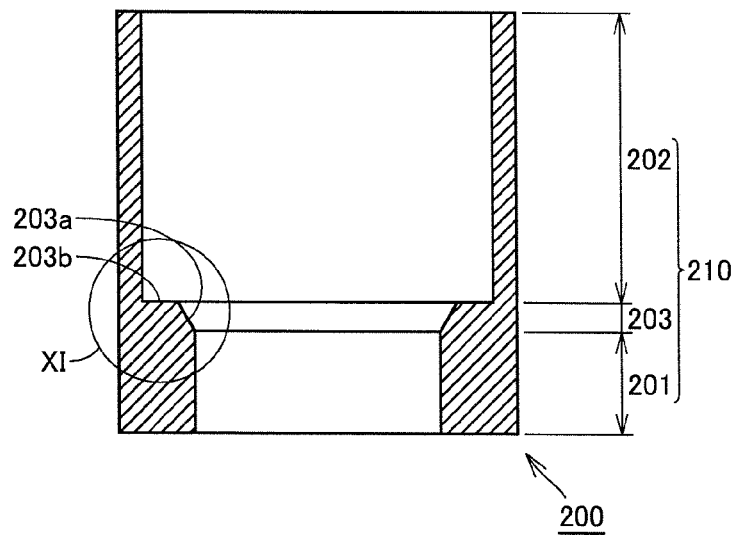
FIG. 10 is a cross-sectional view of a barrel used in a second embodiment.
Figure 11:
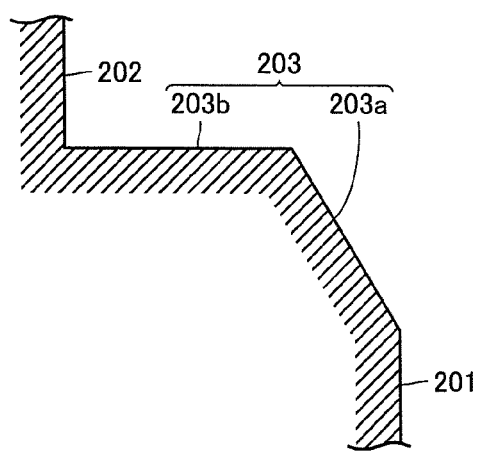
FIG. 11 is an enlarged cross-sectional view of a region surrounded by XI in FIG. 10.
Figure 12:
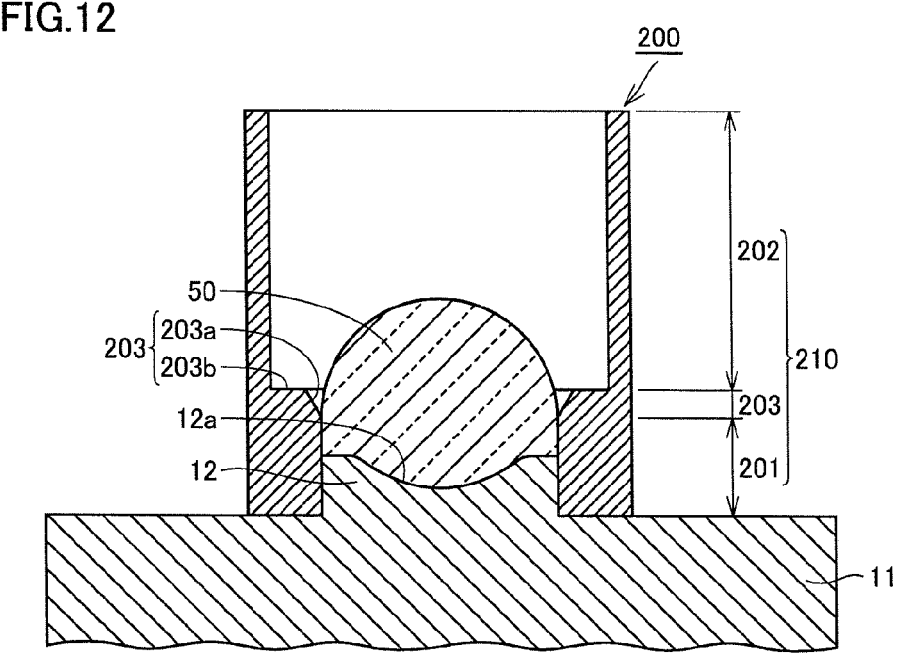
FIG. 12 is a cross-sectional view showing a state where a molten glass drop has been dropped, in a method of manufacturing a barrel-integrated lens of the second embodiment.
Figure 13:
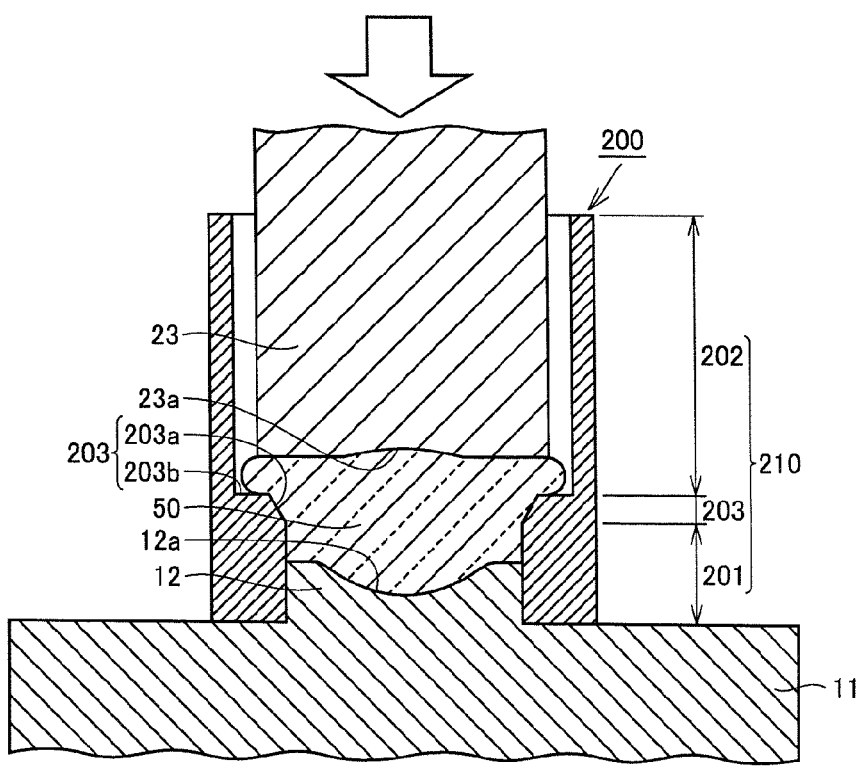
FIG. 13 is a cross-sectional view showing a state where pressure is being applied to the molten glass drop, in the method of manufacturing a barrel-integrated lens of the second embodiment.
Figure 14:
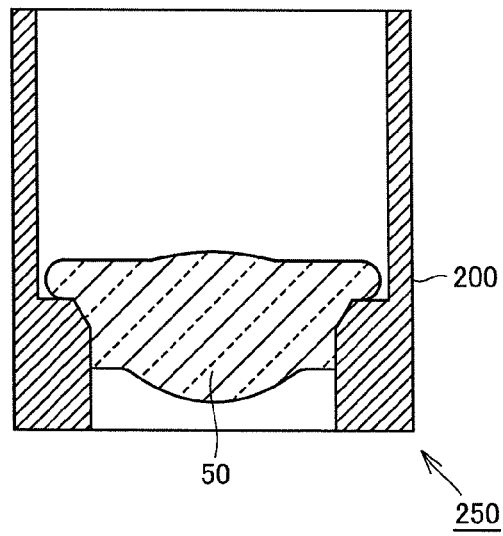
FIG. 14 is a cross-sectional view of the barrel-integrated lens manufactured by the method of manufacturing a barrel-integrated lens of the second embodiment.

FIG. 10 is a cross-sectional view of barrel 200 used in this embodiment, FIG. 11 is an enlarged cross-sectional view of a region surrounded by XI in FIG. 10, FIG. 12 is a cross-sectional view showing a state where a molten glass drop has been dropped, in the method of manufacturing a barrel-integrated lens of this embodiment, FIG. 13 is a cross-sectional view showing a state where pressure is being applied to the molten glass drop, in the method of manufacturing a barrel-integrated lens of this embodiment, and FIG. 14 is a cross-sectional view of a barrel-integrated lens 250 manufactured by the method of manufacturing a barrel-integrated lens of this embodiment.

(Barrel 200)

Referring to FIGS. 10 and 11, the structure of barrel 200 used in this embodiment will be described. FIG. 10 corresponds to a cross section taken along line V-V in the direction of arrows in FIG. 4.

This barrel 200 has a cylindrical shape, and includes a through opening 210 extending in the direction of axis A. Barrel 200 has a height of from about 3 mm to about 5 mm, and an outside diameter of from about 3 mm to about 6 mm.

Through opening 210 includes a first cylindrical opening 201, a second cylindrical opening 202, and a connection opening 203. First cylindrical opening 201 is positioned close to lower die 10, and receives lower cylindrical die 12 inserted therein during the molding of molten glass drop 50. Second cylindrical opening 202 is positioned close to upper die 20, receives upper cylindrical die 23 inserted therein such that a gap is produced in relation to the circumference of upper cylindrical die 23 during the molding of molten glass drop 50, and has a diameter (inside diameter) larger than a diameter (inside diameter) of first cylindrical opening 201. Connection opening 203 couples first cylindrical opening 201 and second cylindrical opening 202 together.

Referring to FIG. 11, in this embodiment, connection opening 203 includes a tapered surface 203a connected to first cylindrical opening 201 and having a diameter that increases from first cylindrical opening 201 toward second cylindrical opening 202, and a radially extending flat surface 203b connecting this tapered surface 203a and second cylindrical opening 202 together.

In this embodiment, first cylindrical opening 201 has a length of about 1.0 mm, second cylindrical opening 202 has a length of about 2.5 mm, and connection opening 203 has a length of about 0.5 mm, in the axial direction.

The same material as that for base material 11 and base material 22 can be used as a material for barrel 200. Examples of preferred materials include a material having a thermal expansion coefficient close to a thermal expansion coefficient ($11.3 \times 10^{-6}$) of molten glass drop 50. For example, austenitic stainless steel (e.g., SUS430 (thermal expansion coefficient: $10.4 \times 10^{-6}$)), or ferritic stainless steel (e.g., Shimomura Tokushu Seiko Co., Ltd., product name: SF20T (thermal expansion coefficient: $11.0 \times 10^{-6}$)) may be used.

When a barrel-integrated lens is manufactured using barrel 200 having the above-described structure, as shown in FIG. 12, molten glass drop 50 forms a substantially spherical shape by surface tension, starting from an upper end of first cylindrical opening 201 of barrel 200 (inner circumferential circle which is a border between first cylindrical opening 201 and connection opening 203), while not contacting connection opening 203, in a region surrounded by the upper end face of lower cylindrical die 12 and the exposed inner circumferential surface of first cylindrical opening 201, in a manner similar to that of the first embodiment.

Then, as shown in FIG. 13, when molten glass drop 50 is pressure molded by lower cylindrical die 12 and upper cylindrical die 23, molten glass drop 50 is spread from tapered surface 203a toward flat surface 203b.

By providing barrel 200 with radially extending flat surface 203b in this manner, pressure can be applied readily to molten glass drop 50 during the press molding by lower cylindrical die 12 and upper cylindrical die 23, as compared to the example where the connection opening is formed of only the tapered surface. In addition, as in the first embodiment, the thermal expansion coefficient of molten glass drop 50 and the thermal expansion coefficient of barrel 200 are substantially the same, and when glass temperature GT of molten glass drop 50 and the temperature of barrel 100 reach appropriate temperatures (substantially the same temperature), molten glass drop 50 is press molded by lower cylindrical die 12 and upper cylindrical die 23. As a result, in the subsequent cooling step, between a joint surface of molten glass drop 50 and a joint surface of barrel 200, the joint surfaces are not separated from each other, thereby obtaining high joint strength between molten glass drop 50 and barrel 200.

Thereafter, as in the first embodiment, upper die 20 is moved up and retracted, and barrel-integrated lens 250 in this embodiment shown in FIG. 14 is collected.

According to the method of manufacturing a barrel-integrated lens in this embodiment described above, as in the first embodiment, a step of molding a lens optical surface on the molten glass drop and a step of integrating the lens with the barrel can be simultaneously performed. Thus, a method of manufacturing a barrel-integrated lens that can require fewer manufacturing steps can be provided.

Furthermore, since the materials for the molten glass drop and barrel are selected from the viewpoint of thermal expansion coefficient, and the time between the dropping and the start of pressing and the time between the start of pressing and the end of pressing in the pressing step are adjusted, high joint strength can be obtained between the molten glass drop and the barrel.

Moreover, by providing barrel 200 with radially extending flat surface 203b, high joint strength can be obtained between molten glass drop 50 and barrel 200.

Third Embodiment

Referring to FIGS. 15 to 20, a method of manufacturing a barrel-integrated lens in this embodiment will be described below. The method of manufacturing a barrel-integrated lens in this embodiment is characterized by a shape of the barrel, and the apparatus and method for manufacturing the barrel-integrated lens are the same as those in the above first embodiment. Accordingly, the structure of a barrel 300 in this embodiment will be described here in detail.

Figure 15:
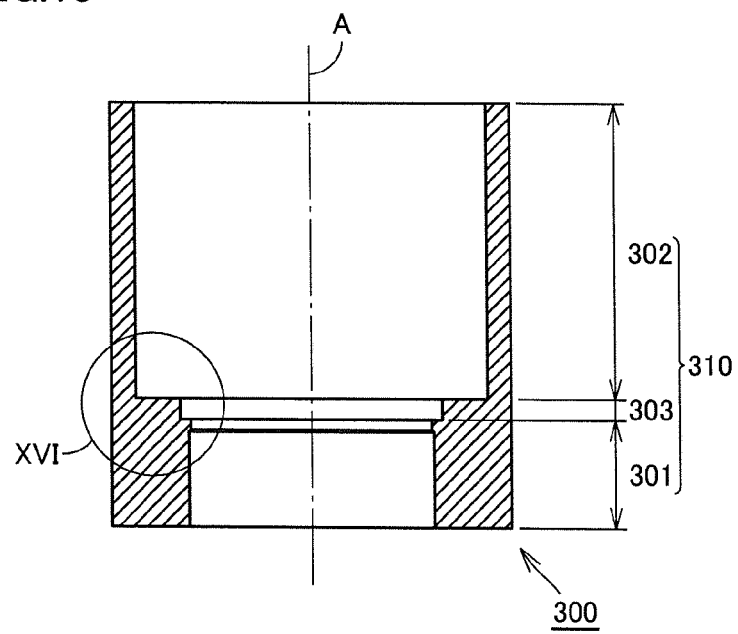
FIG. 15 is a cross-sectional view of a barrel used in a third embodiment.
Figure 16:
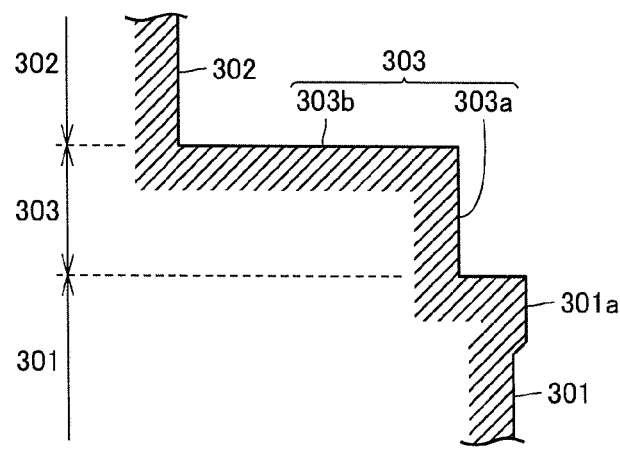
FIG. 16 is an enlarged cross-sectional view of a region surrounded by XVI in FIG. 15.
Figure 17:
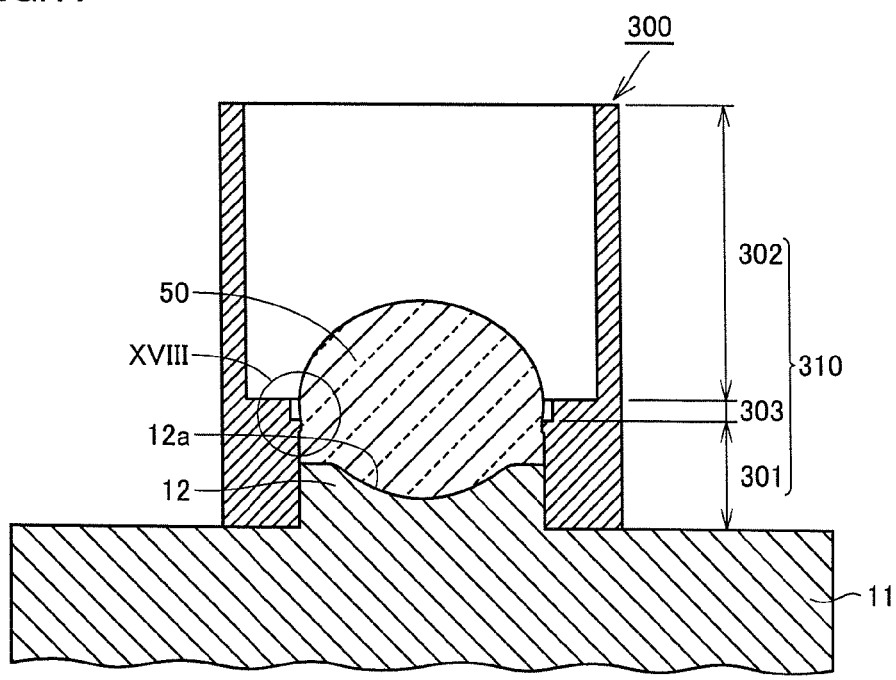
FIG. 17 is a cross-sectional view showing a state where a molten glass drop has been dropped, in a method of manufacturing a barrel-integrated lens of the third embodiment.
Figure 18:
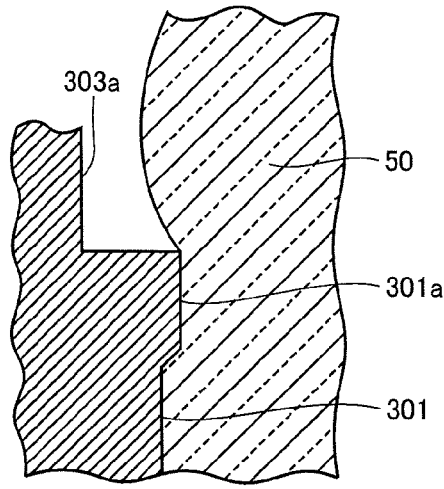
FIG. 18 is an enlarged cross-sectional view of a region surrounded by XVIII in FIG. 17.
Figure 19:
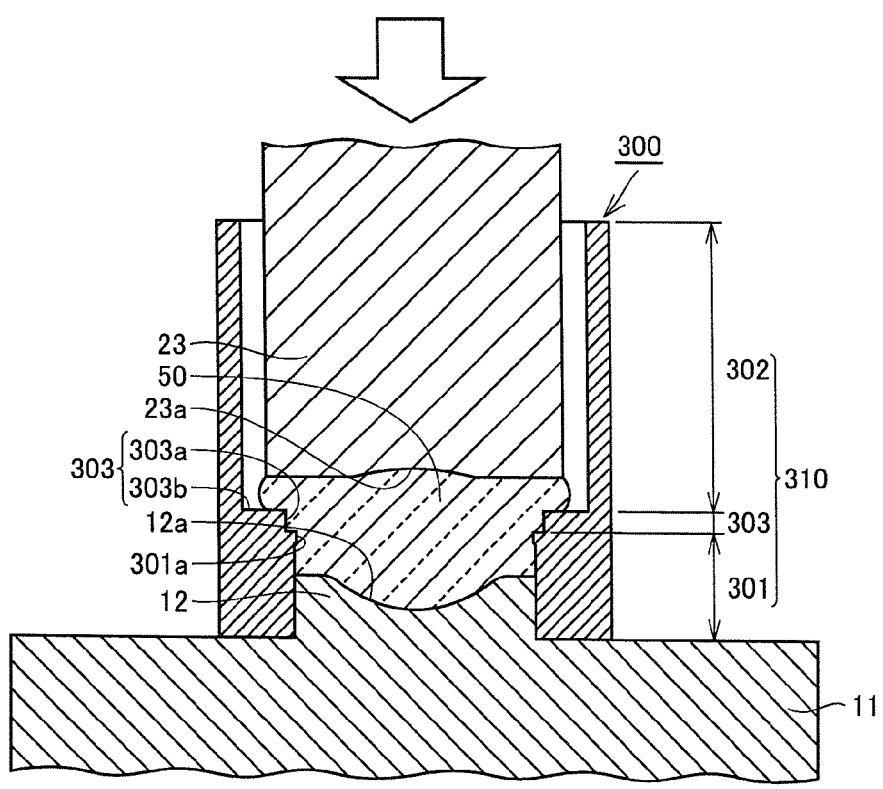
FIG. 19 is a cross-sectional view showing a state where pressure is being applied to the molten glass drop, in the method of manufacturing a barrel-integrated lens of the third embodiment.
Figure 20:
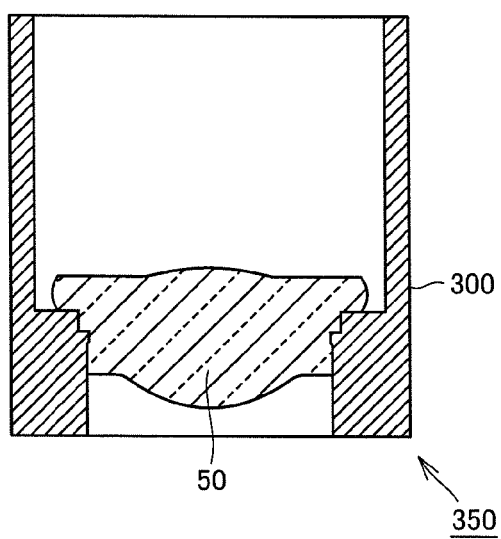
FIG. 20 is a cross-sectional view of the barrel-integrated lens manufactured by the method of manufacturing a barrel-integrated lens of the third embodiment.

FIG. 15 is a cross-sectional view of barrel 300 used in this embodiment, FIG. 16 is an enlarged cross-sectional view of a region surrounded by XVI in FIG. 15, FIG. 17 is a cross-sectional view showing a state where a molten glass drop has been dropped, in the method of manufacturing a barrel-integrated lens of this embodiment, FIG. 18 is an enlarged cross-sectional view of a region surrounded by XVIII in FIG. 17, FIG. 19 is a cross-sectional view showing a state where pressure is being applied to the molten glass drop, in the method of manufacturing a barrel-integrated lens of this embodiment, and FIG. 20 is a cross-sectional view of a barrel-integrated lens 350 manufactured by the method of manufacturing a barrel-integrated lens of this embodiment.

(Barrel 300)

Referring to FIGS. 15 and 16, the structure of barrel 300 used in this embodiment will be described. FIG. 15 corresponds to a cross section taken along line V-V in the direction of arrows in FIG. 4.

This barrel 300 has a cylindrical shape, and includes a through opening 310 extending in the direction of axis A. Barrel 300 has a height of from about 3 mm to about 5 mm, and an outside diameter of from about 3 mm to about 6 mm.

Through opening 310 includes a first cylindrical opening 301, a second cylindrical opening 302, and a connection opening 303. First cylindrical opening 301 is positioned close to lower die 10, and receives lower cylindrical die 12 inserted therein during the molding of molten glass drop 50. Second cylindrical opening 302 is positioned close to upper die 20, receives upper cylindrical die 23 inserted therein such that a gap is produced in relation to the circumference of upper cylindrical die 23 during the molding of molten glass drop 50, and has a diameter (inside diameter) larger than a diameter (inside diameter) of first cylindrical opening 301. Connection opening 303 couples first cylindrical opening 301 and second cylindrical opening 302 together.

Referring to FIG. 16, in this embodiment, first cylindrical opening 301 is provided with a radially inwardly projecting convex portion 301a at its end portion close to connection opening 303. This convex portion 301a may be provided annularly on the entire inner circumferential surface of first cylindrical opening 301, or may be provided intermittently at a prescribed pitch of arrangement.

In addition, connection opening 303 includes a sidewall portion 303a connected to convex portion 301a and having a diameter (inside diameter) larger than that of first cylindrical opening 301 and smaller than that of second cylindrical opening 302, and a radially extending flat surface 303b connecting this sidewall portion 303a and second cylindrical opening 302 together.

In this embodiment, first cylindrical opening 301 has a length of about 1.0 mm, second cylindrical opening 302 has a length of about 2.5 mm, and connection opening 303 has a length of about 0.5 mm, in the axial direction.

The same material as that for base material 11 and base material 22 can be used as a material for barrel 300. Examples of preferred materials include a material having a thermal expansion coefficient close to a thermal expansion coefficient ($11.3 \times 10^{-6}$) of molten glass drop 50. For example, austenitic stainless steel (e.g., SUS430 (thermal expansion coefficient: $10.4 \times 10^{-6}$)), or ferritic stainless steel (e.g., Shimomura Tokushu Seiko Co., Ltd., product name: SF20T (thermal expansion coefficient: $11.0 \times 10^{-6}$)) may be used.

When a barrel-integrated lens is manufactured using barrel 300 having the above-described structure, as shown in FIG. 17, molten glass drop 50 forms a substantially spherical shape by surface tension, starting from an upper end of first cylindrical opening 301 of barrel 300 (end portion of projection 301a close to connection opening 303), while not contacting connection opening 303, in a region surrounded by the upper end of lower cylindrical die 12 and the exposed opening surface of first cylindrical opening 301, in a manner similar to that of the first embodiment.

Then, as shown in FIG. 19, when molten glass drop 50 is pressure molded by lower cylindrical die 12 and upper cylindrical die 23, molten glass drop 50 is spread toward flat surface 303b. Here, convex portion 301a provided on first cylindrical opening 301 digs into molten glass drop 50.

By providing barrel 300 with radially extending flat surface 303b in this manner, pressure can be applied readily to molten glass drop 50 during the press molding by lower cylindrical die 12 and upper cylindrical die 23. In addition, as in the first embodiment, the thermal expansion coefficient of molten glass drop 50 and the thermal expansion coefficient of barrel 300 are substantially the same, and when glass temperature GT of molten glass drop 50 and the temperature of barrel 300 reach appropriate temperatures (substantially the same temperature), molten glass drop 50 is press molded by lower cylindrical die 12 and upper cylindrical die 23. As a result, between a joint surface of molten glass drop 50 and a joint surface of barrel 300, the joint surfaces are not separated from each other in the subsequent cooling step, thereby obtaining high joint strength between molten glass drop 50 and barrel 300.

Furthermore, with convex portion 301a digging into molten glass drop 50, the pulling resistance of molded glass product 50 in relation to barrel 300 can be improved.

Thereafter, as in the first embodiment, upper die 20 is moved up and retracted, and barrel-integrated lens 350 in this embodiment shown in FIG. 20 is collected.

According to the method of manufacturing a barrel-integrated lens in this embodiment described above, as in the first embodiment, a step of molding a lens optical surface on the molten glass drop and a step of integrating the lens with the barrel can be simultaneously performed. Thus, a method of manufacturing a barrel-integrated lens that can require fewer manufacturing steps can be provided.

Furthermore, since the materials for the molten glass drop and barrel are selected from the viewpoint of thermal expansion coefficient, and the time between the dropping and the start of pressing and the time between the start of pressing and the end of pressing in the pressing step are adjusted, high joint strength can be obtained between the molten glass drop and the barrel.

Moreover, by providing barrel 300 with radially extending flat surface 303b and convex portion 301a which is provided on first cylindrical opening 301, high joint strength can be obtained between molten glass drop 50 and barrel 300.

While the above embodiments describe using the materials having substantially the same thermal expansion coefficient for molten glass drop 50 and barrels 100, 200, 300, they are not restrictive. If the thermal expansion coefficient of the barrel is higher than the thermal expansion coefficient of the molten glass drop (the difference between the thermal expansion coefficients being greater than $2\times10^{-6}$), for example, since the barrel has a shrinkage ratio higher than that of the molded glass product in the cooling step, a structure where the barrel compresses the circumference of the molded glass product can be obtained by adjusting their shrinkage ratios.

Even if the thermal expansion coefficient of the barrel is lower than the thermal expansion coefficient of the molten glass drop (the difference between the thermal expansion coefficients being greater than $2\times10^{-6}$), a barrel-integrated lens can be manufactured by adjusting their shrinkage ratios. Shrinkage is determined by thermal expansion coefficient× temperature difference. Thus, by appropriately selecting and adjusting the relation between the temperature of the molten glass drop and the temperature of the barrel at the time of press molding by the upper die, the gap produced between the molded glass product and the barrel upon completion of the cooling can be minimized.

The barrel-integrated lens manufactured by the above-described method of manufacturing a barrel-integrated lens can be used as various types of optical elements such as an image pickup lens for a digital camera and the like, an optical pickup lens for a DVD and the like, and a coupling lens for optical communication.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 lower die; 11, 22 base material; 12 lower cylindrical die; 20 upper die; 23 upper cylindrical die; 50 molten glass drop (molded glass product); 61 molten glass; 62 melting tank; 63 drop nozzle; 65 guide; 100, 200, 300 barrel; 101, 201, 301 first cylindrical opening; 102, 202, 302 second cylindrical opening; 103, 203, 303 connection opening; 110, 210, 310 through opening; 150, 250, 350 barrel-integrated lens; 203a tapered surface; 203b, 303b flat surface; 301a convex portion; 303a sidewall portion.

The invention claimed is:

1. A method of manufacturing a barrel-integrated lens, in which a molded glass product is molded integrally with a barrel made of metal by means of a molten glass drop molding method, said molten glass drop molding method being a method of, providing a lower die and an upper die, dropping a molten glass drop on said lower die, and then press molding said molten glass drop by said lower die and said upper die, said lower die including a lower cylindrical die, said lower cylindrical die having an optical surface for applying pressure to said molten glass drop at an upper end face of the lower cylindrical die and extending toward said upper die, said upper die including an upper cylindrical die, said upper cylindrical die being opposed to said lower cylindrical die, having an optical surface for applying pressure to said molten glass drop at a lower end face of the upper cylindrical die, and extending toward said lower die, said barrel including a through opening extending in an axial direction, said through opening including
a first cylindrical opening receiving said lower cylindrical die inserted therein during molding of said molten glass drop,
a second cylindrical opening receiving said upper cylindrical die inserted therein such that a gap is produced in relation to the circumference of said upper cylindrical die during the molding of said molten glass drop, the second cylindrical opening having a diameter larger than a diameter of said first cylindrical opening, and
a connection opening coupling said first cylindrical opening and said second cylindrical opening together, said method of manufacturing a barrel-integrated lens comprising the steps of:

inserting said lower cylindrical die into said through opening from a side of said first cylindrical opening of said through opening such that an upper end portion of said lower cylindrical die is positioned part way in the axial direction of said first cylindrical opening to expose a portion of an inner circumferential surface of said first cylindrical opening;

dropping a prescribed amount of said molten glass drop from a side of said second cylindrical opening such that said molten glass drop forms a substantially spherical shape by surface tension, while not contacting an exposed opening surface of said connection opening, said molten glass drop disposed in a region bounded by said upper end face of said lower cylindrical die and the portion of the inner circumferential surface of said first cylindrical opening; and inserting said upper cylindrical die into said through opening from the side of said second cylindrical opening, and press molding said molten glass drop by said lower cylindrical die and said upper cylindrical die such that said molten glass drop is pressure welded to said connection opening.

2. The method of manufacturing a barrel-integrated lens according to claim 1, wherein
a thermal expansion coefficient of said molten glass drop and a thermal expansion coefficient of said barrel are substantially identical to each other, and
said step of press molding said molten glass drop by said lower cylindrical die and said upper cylindrical die is performed after a lapse of time during which a temperature of said molten glass drop and a temperature of said barrel reach substantially an identical temperature, since said step of dropping said molten glass drop.

3. The method of manufacturing a barrel-integrated lens according to claim 1, wherein
said connection opening includes a tapered surface, said tapered surface connecting said first cylindrical opening and said second cylindrical opening together, and having an inside diameter that increases from said first cylindrical opening toward said second cylindrical opening.

4. The method of manufacturing a barrel-integrated lens according to claim 1, wherein
said connection opening includes a tapered surface connected to said first cylindrical opening and having an inside diameter that increases from said first cylindrical opening toward said second cylindrical opening, and a radially extending flat surface connecting said tapered surface and said second cylindrical opening together.

5. The method of manufacturing a barrel-integrated lens according to claim 1, wherein
said first cylindrical opening includes a radially inwardly projecting convex portion at its end portion.

6. The method of manufacturing a barrel-integrated lens according to claim 5 wherein
said connection opening includes a sidewall connected to said convex portion and having an inside diameter larger than that of said first cylindrical opening, and a radially extending flat surface connecting said sidewall and said second cylindrical opening together.

7. The method of manufacturing a barrel-integrated lens according to claim 5, wherein
said convex portion is provided annularly on the entire inner circumferential surface of said first cylindrical opening, or is provided intermittently at prescribed intervals.

8. The method of manufacturing a barrel-integrated lens according to claim 2, wherein
said connection opening includes a tapered surface, said tapered surface connecting said first cylindrical opening and said second cylindrical opening together, and having an inside diameter that increases from said first cylindrical opening toward said second cylindrical opening.

9. The method of manufacturing a barrel-integrated lens according to claim 2, wherein
said connection opening includes a tapered surface connected to said first cylindrical opening and having an inside diameter that increases from said first cylindrical opening toward said second cylindrical opening, and a radially extending flat surface connecting said tapered surface and said second cylindrical opening together.

10. The method of manufacturing a barrel-integrated lens according to claim 2, wherein
said first cylindrical opening includes a radially inwardly projecting convex portion at its end portion.

11. The method of manufacturing a barrel-integrated lens according to claim 10, wherein
said connection opening includes a sidewall connected to said convex portion and having an inside diameter larger than that of said first cylindrical opening, and a radially extending flat surface connecting said sidewall and said second cylindrical opening together.

12. The method of manufacturing a barrel-integrated lens according to claim 10, wherein
said convex portion is provided annularly on the entire inner circumferential surface of said first cylindrical opening, or is provided intermittently at prescribed intervals.

\* \* \* \* \*